United States Patent
Noll et al.

(10) Patent No.: US 9,776,655 B2
(45) Date of Patent: Oct. 3, 2017

(54) STEERING SYSTEM

(71) Applicant: ROBERT BOSCH AUTOMOTIVE STEERING GMBH, Schwaebisch Gmuend (DE)

(72) Inventors: Stephen Noll, Moegglingen (DE); Frederik Schubert, Schwaebisch Gmuend (DE); Albert Neufeld, Schwaebisch Gmuend (DE)

(73) Assignee: Robert Bosch Automotive Steering GmbH (DE)

( * ) Notice: Subject to any disclaimer, the term of this patent is extended or adjusted under 35 U.S.C. 154(b) by 0 days.

(21) Appl. No.: 15/024,121

(22) PCT Filed: Sep. 17, 2014

(86) PCT No.: PCT/EP2014/069765
§ 371 (c)(1),
(2) Date: Mar. 23, 2016

(87) PCT Pub. No.: WO2015/074782
PCT Pub. Date: May 28, 2015

(65) Prior Publication Data
US 2016/0355209 A1 Dec. 8, 2016

(30) Foreign Application Priority Data
Nov. 21, 2013 (DE) .......... 10 2013 112 841

(51) Int. Cl.
*B62D 5/04* (2006.01)
*B62D 3/12* (2006.01)

(52) U.S. Cl.
CPC .......... *B62D 5/0403* (2013.01); *B62D 3/126* (2013.01)

(58) Field of Classification Search
CPC ......... B62D 5/0403; B62D 3/126; B62D 5/04
See application file for complete search history.

(56) References Cited

U.S. PATENT DOCUMENTS

| | | | | |
|---|---|---|---|---|
| 5,237,905 A * | 8/1993 | Kuttruf | ........... | F15B 15/24 91/380 |
| 6,257,364 B1 * | 7/2001 | Parkhill | ........... | B62D 5/064 180/417 |
| 6,799,655 B2 * | 10/2004 | Hama | ........... | B62D 5/0403 180/444 |
| 8,584,791 B2 * | 11/2013 | Sakamaki | ........... | B62D 5/09 180/414 |

(Continued)

FOREIGN PATENT DOCUMENTS

DE 10 2007 002 684 7/2008
DE 10 2011 001 217 9/2012

*Primary Examiner* — Tony H. Winner
*Assistant Examiner* — Michael R Stabley
(74) *Attorney, Agent, or Firm* — Jordan and Koda, PLLC

(57) ABSTRACT

A steering system for a motor vehicle comprising a steering linkage, a steering drive, a gearbox transmitting a driving movement of the steering drive to the steering linkage, and a multi-piece housing that at least partially surrounds the steering linkage, the steering drive and/or the gearbox, having a drainage groove formed in a first contact surface of a first housing part of the multi-piece housing, the first contact surface being seated against a mating second contact surface of a second housing part of the multi-piece housing.

8 Claims, 1 Drawing Sheet

(56) References Cited

U.S. PATENT DOCUMENTS

| | | | |
|---|---|---|---|
| 8,881,861 B2* | 11/2014 | Tojo | B62D 5/0424 |
| | | | 180/444 |
| 2012/0152645 A1* | 6/2012 | Matthias | F16K 15/148 |
| | | | 180/442 |
| 2013/0306396 A1* | 11/2013 | Tojo | B62D 5/0424 |
| | | | 180/444 |
| 2014/0007738 A1* | 1/2014 | Froehlich | B62D 3/00 |
| | | | 74/606 R |
| 2014/0291062 A1* | 10/2014 | Tojo | B62D 5/0424 |
| | | | 180/443 |

* cited by examiner

STEERING SYSTEM

The invention relates to a steering system for a motor vehicle.

BACKGROUND OF THE INVENTION

In the majority of motor vehicles, (power) steering systems are installed which generate a supporting torque during steering and thereby reduce the steering torque to be applied by the driver on the steering column.

Known steering systems comprise a gearbox, which reduces the ratio of the driving power of a hydraulic or electric drive and transmits this power to the steering column or a toothed rack of the steering system, for example. Such gearboxes can be designed in the manner of a helical rolling gear mechanism, for example, and in particular as a helical gear mechanism or worm gear mechanism.

A steering system is known from DE 102011001 217 A1 which comprises an electric steering drive, the rotational movement of which is transmitted via a gearbox to a steering linkage. By virtue of a corresponding connection of the two ends of the steering linkage to the steerable wheels of the motor vehicle, the translation of the steering linkage taking place as a function of the rotational movement of the steering drive results in the desired steering motion of the wheels. The steering system furthermore comprises a multi-piece housing, the housing parts of which surround the steering linkage, the gearbox, and the steering drive. The drive housing part and the gearbox housing part are connected to each other via screw connections. A sealing element is disposed in the contact region between these two housing parts. This is intended to prevent moisture and dust from penetrating from the surroundings into the housing via the contact region. In the steering system disclosed in DE 102011001217 A1, the sealing element is designed as a radially acting sealing ring, which is disposed in a radial groove that was introduced into a lateral face of a connecting neck.

It has been shown that such sealing of two housing parts of a housing of a steering system is not always sufficient in a highly corrosive environment, such as may exist as a result of the use of winter road salt.

Proceeding from this prior art, it was the object of the invention to provide a steering system for a motor vehicle which seals well with respect to the surroundings in a manner that has a preferably simple design.

It is the object of the invention to improve sealing of a contact region between two housing parts of a housing of a steering system by reducing, to as great an extent as possible, the amount of moisture that penetrates into the contact region and advances to a seal disposed in the contact region. This is to be achieved by deliberately collecting and discharging this moisture.

SUMMARY OF THE INVENTION

A steering system of the type in question for a motor vehicle which comprises at least one steering linkage, a steering drive, a gearbox transmitting a driving movement of the steering drive to the steering linkage, and a multi-piece housing that at least partially surrounds the steering linkage, the steering drive and/or the gearbox, is thus characterized according to the invention in that (at least) one drainage groove is formed in (at least) one contact surface that is formed by a housing part and is seated (in at least one section) against a mating contact surface of another housing part. The drainage groove is used to collect and discharge liquid, and possibly dirt particles, such as dust, which are present in dissolved or undissolved form in the liquid, penetrating into the contact region formed between the contact surface and the mating contact surface.

The steering drive is preferably designed as an electric motor; however, it may also be based on a hydraulic motor.

So as to discharge the liquid, it may preferably be provided that the drainage groove is in fluid-conducting connection with the surroundings of the housing. The liquid collected by way of the drainage groove can thus be discharged to the outside of the housing. Alternatively, however, there is also the option to discharge the liquid by way of the drainage groove into an arbitrary reservoir, formed by the housing for example. The liquid can then be permanently or temporarily stored in this reservoir.

In a preferred embodiment of the steering system according to the invention, it may be provided that the drainage groove is annular. In this way it can be easily achieved that all liquid entering the contact region can be collected and discharged via a single connecting line to the surroundings or a reservoir. Particularly preferably, it may additionally be provided that the drainage groove surrounds a housing opening (of the housing interior) in an annular manner.

In a further preferred embodiment of the steering system according to the invention, it may be provided that the drainage groove is also used to a seal sealing the contact region, comprising at least one sealing element that is used for this purpose. Since the amount of liquid admitted to the seal is preferably to be reduced by way of the drainage groove, so as to improve the overall sealing action in the contact region, it should thus preferably be provided that the drainage groove is disposed between the outside of the housing and the seal formed between the contact surface and the mating contact surface. The sealing element forming the seal can have any arbitrary design. For example, a conventional sealing ring, such as an O-ring, can be used, which is held deformed between the contact surface and the mating contact surface. This sealing ring can also be disposed in a radially or axially oriented groove. Other types of seals, such as labyrinth seals, can likewise be used.

In a further preferred embodiment of the steering system according to the invention, it may be provided that the housing comprises a drive housing part, which surrounds the steering drive, and a gearbox housing part, which is connected to the drive housing part and surrounds the gearbox, wherein the drainage groove is disposed in a contact surface serving as the connection between the drive housing part and the gearbox housing part. This can be particularly advantageous because the drive housing part and the gearbox housing part connected thereto can be exposed parts of the steering system, which can be subjected to significant corrosive soiling during operation of the motor vehicle.

The housing part forming the drainage groove, and in particular all housing parts of the steering system, can preferably be made of a metal (in particular a light metal) and/or of plastic material. A simple and cost-effective option to produce the housing parts can involve primary shaping, wherein in particular diecasting, for example from an aluminum alloy, or injection molding from one or more plastic materials can be advantageous. If the housing part forming the drainage groove is produced by primary shaping, it is preferably also possible to form the drainage groove directly by corresponding shaping of the mold that is used. In this case, the provision according to the invention of a drainage groove would not be associated with any (relevant) additional manufacturing complexity.

However, it is also possible to introduce the drainage groove by way of machining, for example by milling or turning, into the corresponding housing part, wherein the housing part can also have been produced by primary shaping. This can, advantageously, and in particular, be implemented with only little added complexity, if the contact surface into which the drainage groove is to be introduced is worked by way of machining or secondary machining.

The liquid collected in the drainage groove is preferably discharged solely by way of the gravity acting on the liquid. It is thus preferably provided that a connecting section, which connects the drainage groove to the surroundings or a reservoir in a fluid-conducting manner, has a downward orientation (based on the direction of gravity). This orientation refers to the arrangement of the steering system in a horizontal motor vehicle.

The invention will be described hereafter in greater detail based on one preferred embodiment shown in the drawings.

DESCRIPTION OF THE PREFERRED EMBODIMENT

Figure 1:
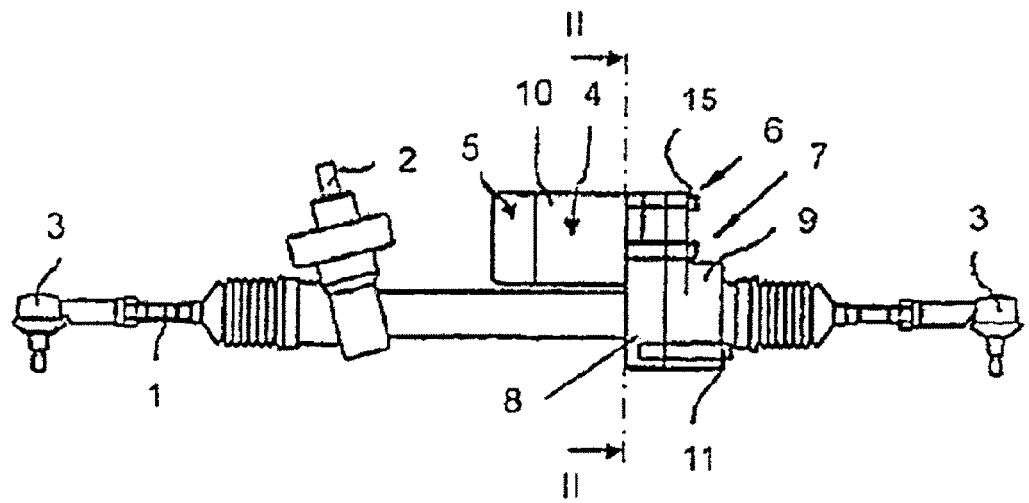
FIG. 1 shows a steering system according to the invention in a simplified representation.

The steering system shown in FIG. 1 represents an electric power steering system for a passenger car, for example, the remainder of which is not shown. This system comprises a steering linkage 1, which in one section can be designed as a toothed rack having spiral teeth. A steering pinion (not visible), which is non-rotatably connected to a steering shaft 2, meshes with the steering linkage 1. The steering shaft 2, in turn, is used for the non-rotatable connection to a steering column, which is not shown, and to the steering wheel of the passenger car connected thereto. Tie rod ends 3, which are provided for the connection to wheel steering arms (not shown), are provided at the two ends of the steering linkage 1. The wheel steering arms are used to translate a longitudinal axial translation of the steering linkage 1 into a pivoting motion of the steered wheels of the passenger car.

The steering system furthermore also includes an electric motor-based steering drive 4. The electric motor of the steering drive 4, controlled by a control unit 5, generates a supporting power steering torque as a function of the steering torque that a driver of the passenger car exerts on the steering wheel, and thus on the steering linkage. The ratio of this power steering torque, or the rotational movement provided for this purpose by a rotor of the electric motor, is reduced by way of a gearbox 6 onto the steering linkage 1.

The steering shaft 2, including the steering pinion, the steering linkage 1, the gearbox 6, the electric motor, and the control unit 5 comprise or are each surrounded by a housing part. These housing parts are connected to each other and together form a multi-piece housing of the steering system. The gearbox housing part 7 itself, which surrounds the gearbox, has a two-piece design. These two sections 8, 9 of the gearbox housing part 7 are connected to each other and to the drive housing part 10, which surrounds the electric motor, by way of multiple screw connections 15.

Figure 2:
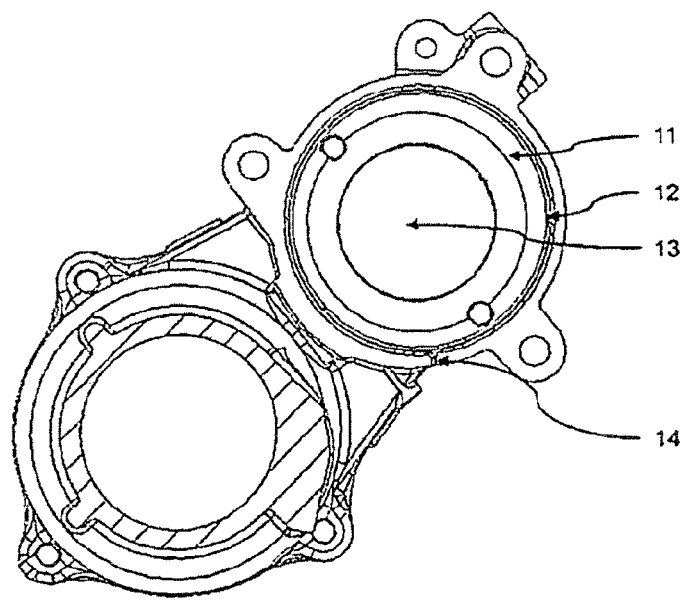
FIG. 2 shows the side of a section of a gearbox housing part of the steering system identified with II-II in FIG. 1.

FIG. 2 shows the section 8 of the two-piece gearbox housing part 7 which is shown on the left in FIG. 1. It shows the side of this section 8 of the gearbox housing part 7 denoted by II-II in FIG. 1. It is apparent that a circular ring-shaped, continuous drainage groove 12 is introduced into the contact surface 11, which is provided for contact with a mating contact surface of the drive housing part 10. This drainage groove 12 is concentric to a housing opening 13, which is designed so as to overlap a corresponding housing opening of the drive housing part 10 and thus forms a passage between these two housing parts. An output shaft of the steering drive 4 formed by the rotor of the electric motor extends through this passage.

A groove-shaped connecting section 14 extends away from the drainage groove 12 and connects the drainage groove 12 to the outside of the gearbox housing part 7, and thus to the surroundings, in a fluid-conducting manner.

The drainage groove 12 is used to collect liquid and other soiling penetrating from the outside of the housing into the contact region formed between the contact surface 11 and the mating contact surface. The liquid, and dirt particles possibly contained therein, such as dust, coalesce in the drainage groove 12 and, as a result of gravity, flow therein in the direction of the connecting section 14 and are then discharged to the outside of the housing or the surroundings via the connecting section 14. For this purpose, it is provided that the connecting section 14 ideally opens into the drainage groove 12 at the lowest point (based on the direction of gravity), and moreover is itself oriented substantially vertically, and thus in the direction of gravity. FIG. 2 shows the approximate orientation of the section 8 of the gearbox housing part 7, with the steering system installed in the passenger car, when the passenger car is sitting on substantially horizontal ground.

In addition to the drainage groove 12, a sealing element (not shown) may be provided on the inside of the same in the contact region formed between the contact surface 11 and the mating contact surface. This may be designed as a conventional O-ring, for example. The O-ring may be disposed in a circular ring-shaped groove, which is introduced into the mating contact surface of the drive housing part 10, for example, so as to fix the same in terms of the position thereof.

LIST OF REFERENCE NUMERALS 1 steering linkage
2 steering shaft
3 tie rod end
4 steering drive
5 control unit
6 gearbox
7 gearbox housing part
8 first section of the gearbox housing part
9 second section of the gearbox housing part
10 drive housing part
11 contact surface
12 drainage groove
13 housing opening
14 connecting section
15 screw connection

The invention claimed is:

1. A steering system for a motor vehicle, comprising a steering linkage, a steering drive, a gearbox transmitting a driving movement of the steering drive to the steering linkage, and a multi-piece housing that at least partially surrounds the steering linkage and at least one of the steering drive and the gearbox, wherein a drainage groove is formed in a first contact surface of a first housing part of the multi-piece housing, the first contact surface being seated against a mating second contact surface of a second housing part of the multi-piece housing, and wherein the drainage groove is annular.

2. The steering system according to claim 1, wherein the drainage groove is configured to be in fluid-conducting connection with a surrounding environment of the housing.

3. The steering system according to claim 1, wherein the drainage groove surrounds an opening of the first housing part in an annular manner.

4. A steering system according to claim 1, wherein the drainage groove is disposed between the outside of the multi-piece housing and a sealing element disposed between the first contact surface and the mating second contact surface.

5. A method for producing a steering system according to claim 1, comprising forming the first housing part by way of primary shaping, and forming the annular drainage groove in the first contact surface of the first housing part of the multi-piece housing, the first contact surface being seated against the mating second contact surface of the second housing part of the multi-piece housing.

6. A method for producing a steering system according to claim 5, wherein the annular drainage groove is introduced into the first housing part by way of machining.

7. A steering system for a motor vehicle, comprising a steering linkage, a steering drive, a gearbox transmitting a driving movement of the steering drive to the steering linkage, and a multi-piece housing that at least partially surrounds the steering linkage and at least one of the steering drive and the gearbox, wherein a drainage groove formed in a first contact surface of a first housing part of the multi-piece housing, the first contact surface being seated against a mating second contact surface of a second housing part of the multi-piece housing, and wherein the multi-piece housing comprises the first housing part and the second housing part, the first housing part being a drive housing part which surrounds the steering drive, and the second housing part being a gearbox housing part which is connected to the drive housing part and surrounds the gearbox, wherein the drainage groove is disposed in said first contact surface establishing the connection between the drive housing part and the gearbox housing part.

8. A motor vehicle comprising a steering system, the steering system comprising a steering linkage, a steering drive, a gearbox transmitting a driving movement of the steering drive to the steering linkage, and a multi-piece housing that at least partially surrounds the steering linkage and at least one of the steering drive and the gearbox, wherein a drainage groove is formed in a first contact surface of a first housing part of the multi piece housing, the first contact surface being seated against a mating second contact surface of a second housing part of the multi piece housing, wherein the drainage groove is configured to be in fluid-conducting connection with a surrounding environment of the housing, and wherein the drainage groove comprises an annular first groove portion and a fluid-conducting connecting that connects the annular first groove portion to a surrounding environment of the multi-piece housing and is configured to have a downward orientation portion proceeding from the annular first groove portion in the direction of the surrounding environment while said motor vehicle has a horizontal orientation.

* * * * *